(12) United States Patent
Kwon

(10) Patent No.: US 7,528,500 B2
(45) Date of Patent: May 5, 2009

(54) INTELLIGENT WIPER CONTROL SYSTEM FOR VEHICLE

(75) Inventor: Mun-Soon Kwon, Ichon-Si (KR)

(73) Assignee: Hyundai Autonet Co. Ltd., Ichon-Si Kyunggi-Do (KR)

( * ) Notice: Subject to any disclaimer, the term of this patent is extended or adjusted under 35 U.S.C. 154(b) by 0 days.

(21) Appl. No.: 11/933,866

(22) Filed: Nov. 1, 2007

(65) Prior Publication Data

US 2008/0100137 A1    May 1, 2008

(30) Foreign Application Priority Data

Nov. 1, 2006    (KR) .................... 10-2006-0107381

(51) Int. Cl.
*B60L 3/00*     (2006.01)
*H02P 1/02*     (2006.01)
*A47L 1/03*     (2006.01)
*B60S 1/08*     (2006.01)

(52) U.S. Cl. ................. 307/10.1; 318/444; 15/250.001; 15/250.17

(58) Field of Classification Search ................. 318/444; 307/10.1; 15/250.001, 250.17
See application file for complete search history.

(56) References Cited

U.S. PATENT DOCUMENTS

| 4,097,839 | A | * | 6/1978 | Lesiak ..................... 340/425.5 |
| 5,252,898 | A | * | 10/1993 | Nolting et al. ............... 318/444 |
| 5,949,150 | A | * | 9/1999 | MacDonald ............... 307/10.1 |
| 6,023,107 | A | * | 2/2000 | Grass ....................... 307/10.1 |
| 6,555,980 | B2 | * | 4/2003 | Yabe ......................... 318/443 |
| 6,690,130 | B2 | * | 2/2004 | Klug et al. .................... 318/44 |
| 7,304,443 | B2 | * | 12/2007 | Argo et al. .................... 318/16 |
| 7,345,445 | B2 | * | 3/2008 | Huntzicker ................. 318/444 |
| 7,466,096 | B2 | * | 12/2008 | Kim et al. ................... 318/443 |
| 2006/0220806 | A1 | * | 10/2006 | Nguyen ................. 340/426.36 |

* cited by examiner

*Primary Examiner*—Albert W Paladini
*Assistant Examiner*—Hal I Kaplan
(74) *Attorney, Agent, or Firm*—IPLA P.A.; James E. Bame

(57) ABSTRACT

Disclosed herein is an intelligent wiper control system for a vehicle. A rain sensor unit controls the speed of wipers based on the amount of rain. An electronic control unit analyzes the input signal of the input unit. An output unit controls the output integrated circuits, and adjusts and controls the driving of the wiper motor. The input unit includes a remote key for inputting a signal for controlling the driving of a wiper system and wirelessly transmitting the signal. An output unit causes an emergency light to blink when the drive power of the wiper motor is set to firm power and the driver turns off an ignition key and then gets out of the vehicle while wipers are turned on.

1 Claim, 2 Drawing Sheets

US 7,528,500 B2

INTELLIGENT WIPER CONTROL SYSTEM FOR VEHICLE

CROSS REFERENCE

This application claims foreign priority under Paris Convention and 35 U.S.C. § 119 to Korean Patent Application No. 10-2006-0107381, filed Nov. 1, 2006 with the Korean Intellectual Property Office.

BACKGROUND OF THE INVENTION

1. Field of the Invention

The present invention relates generally to an intelligent wiper control system for a vehicle, and, more particularly, to an intelligent wiper control system for a vehicle, which is configured to enable remote operation of the wiper system of a vehicle, so that a phenomenon, in which wipers stop in the middle of the windshield of a vehicle when an ignition key is turned off while the wipers are being operated, can be prevented, and the wiper system can be remotely operated from outside the vehicle, thereby achieving the convenience of the use of a vehicle.

2. Description of the Related Art

Generally, a vehicle is equipped with a wiper system for wiping raindrops from the windshield of the vehicle when it rains.

As shown in FIG. 1, the wiper system of a vehicle includes a rain sensor for adjusting the operating speed of wipers based on the amount of rain, inputting a signal to drive power, sensing the input signal, and enabling the wipers to be driven.

However, the above-described conventional wiper system controls a wiper motor using a wiper operation switch provided in a vehicle. Therefore, there is a problem in that there is no method of driving a wiper system using remote control or a separate means.

Further, the method of informing a driver of the operational status of wipers is insufficient, and thus the necessity of improving the method for vehicles has arisen.

SUMMARY OF THE INVENTION

Accordingly, the present invention has been made keeping in mind the above problems occurring in the prior art, and an object of the present invention is to provide an intelligent wiper control system for a vehicle, in which the electronic control unit of a vehicle is provided with a remote wireless reception unit, and the drive power for a wiper motor is set to firm power, so that the wiper system of the vehicle can be remotely controlled, thereby providing high-level convenience to the driver of the vehicle, and allowing a driver to be easily made aware of the operation of wipers and to turn on/off the wiper system even when an ignition key is turned off while the wipers are being operated.

In order to accomplish the above object, the present invention provides an intelligent wiper control system for a vehicle, including: an input unit configured to allow the driver of a vehicle to manipulate a wired/wireless switch and to process an on/off signal; a rain sensor unit configured to control the speed of wipers based on the amount of rain; an electronic control unit configured to analyze the input signal of the input unit, to control the various types of output Integrated Circuits (ICs), and to control a wiper motor; and an output unit configured to control the various types of output ICs based on data processed by the electronic control unit, and to adjust and control the driving of the wiper motor; wherein the input unit includes a remote key for inputting a signal for controlling the driving of a wiper system and wirelessly transmitting the signal; wherein the rain sensor unit senses the amount of rain; wherein the electronic control unit includes a reception unit for receiving the input wireless signal of the remote key of the input unit; and wherein the output unit causes an emergency light to blink when the drive power of the wiper motor is set to firm power and the driver of the vehicle turns off an ignition key and then gets out of the vehicle while wipers are turned on.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
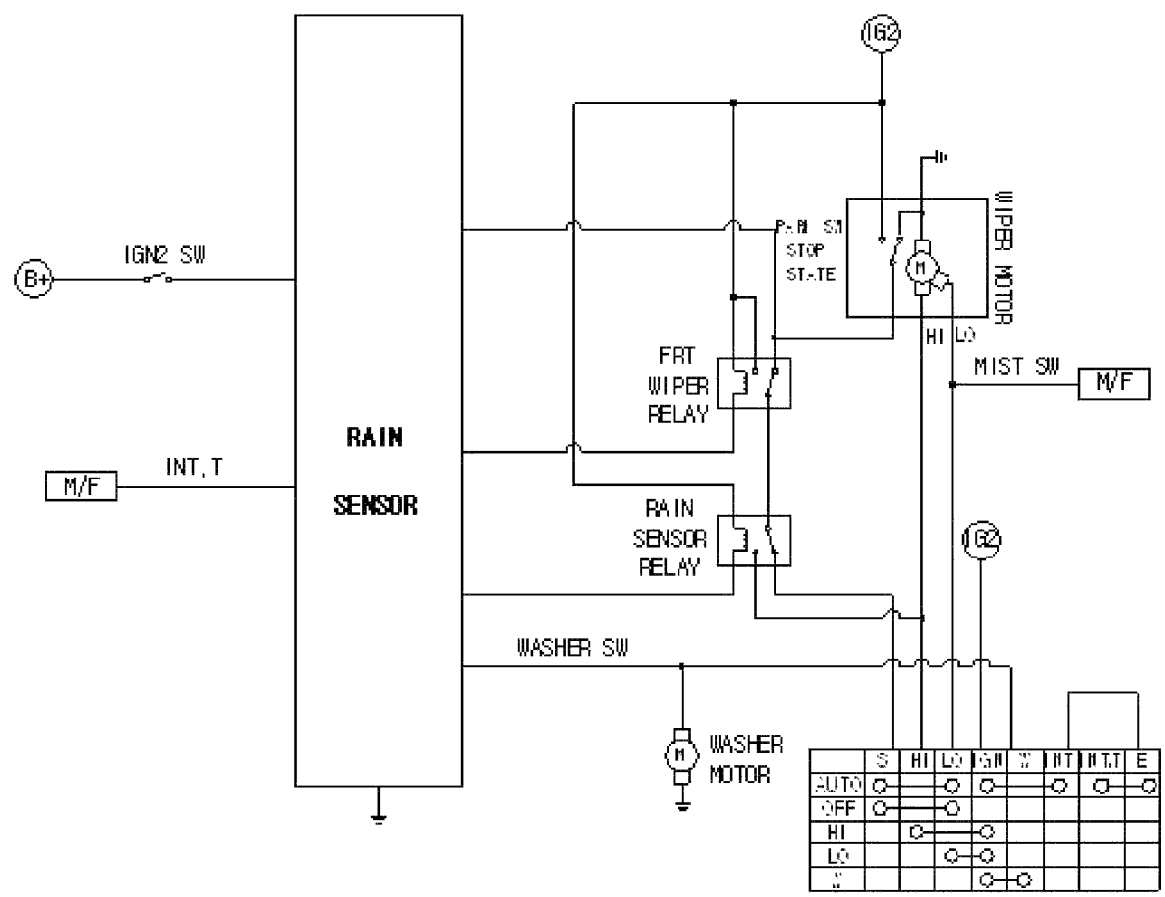
FIG. 1 is a block diagram showing a conventional wiper system for a vehicle.

Reference now should be made to the drawings, in which the same reference numerals are used throughout the different drawings to designate the same or similar components.

Hereinafter, the configuration and operation of the present invention will be described in detail with reference to the attached drawings.

Figure 2:
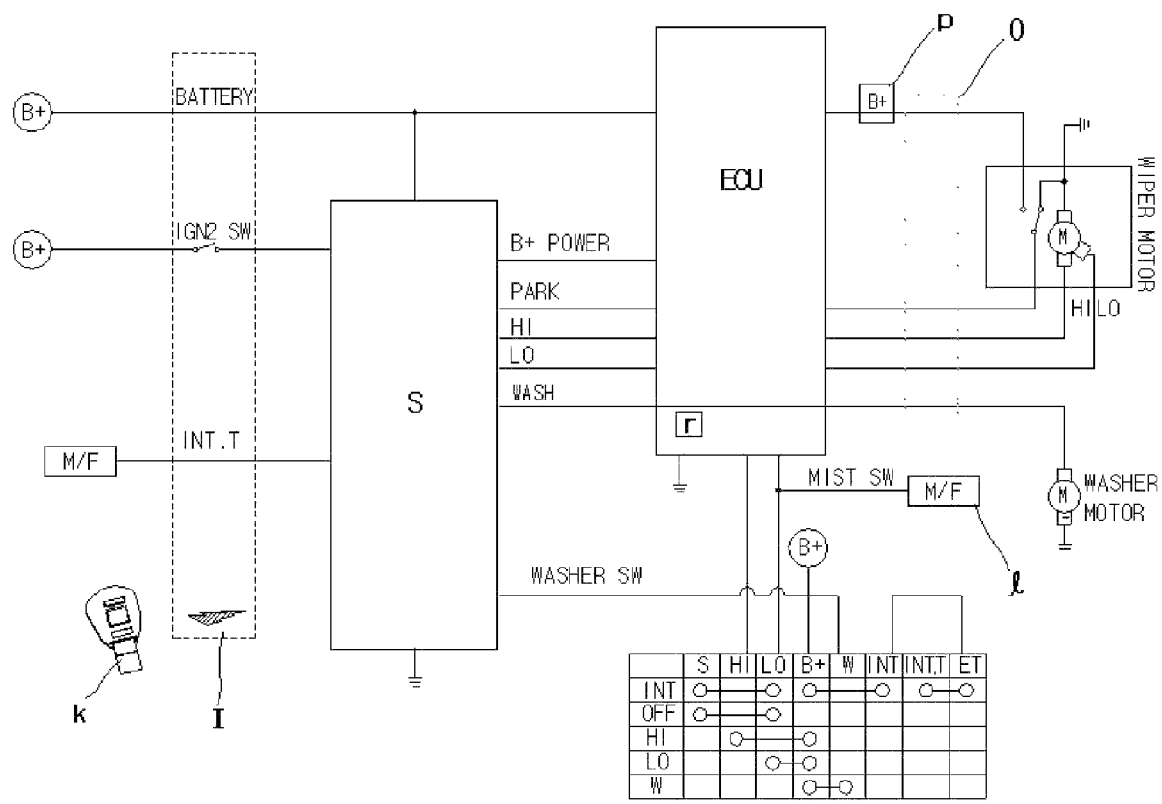
FIG. 2 is a block diagram showing an intelligent wiper control system for a vehicle according to the present invention.

FIG. 2 is a block diagram showing an intelligent wiper control system for a vehicle according to the present invention.

As shown in FIG. 2, the intelligent wiper control system for a vehicle according to the present invention includes an input unit 'I' configured to allow the driver of a vehicle to manipulate a wired/wireless switch 'IGN2 SW' and to process an on/off of the vehicle, a rain sensor unit 'S' configured to adjust the speed of wipers based on the amount of rain, an electronic control unit 'ECU' configured to analyze the input signals including B+Power, PARK, HI, LO, WASH from the input unit 'I', to control the various types of output Integrated Circuits (ICs), and to control a wiper motor, and an output unit 'O', configured to control the various types of output ICs based on data processed by the electronic control unit 'ECU', and to adjust and control the driving of the wiper motor 'M'. Other elements and signals in FIG. 2 include M/F, INT.T, MIST SW, W, INT, ET, OFF, and WAHSER SW.

The input unit 'I' includes a remote key 'k' for inputting a signal for controlling the driving of a wiper system and wirelessly transmitting the signal. The rain sensor unit 'S' senses the amount of rain.

The electronic control unit 'ECU' includes a reception unit 'r' for receiving the input wireless signal of the remote key 'r' of the input unit 'I'.

The output unit 'O' is designed such that an emergency light I blinks when the drive power of the wiper motor is set to firm power 'p', and the driver of a vehicle turns off an ignition key and then gets out of the vehicle while wipers are turned on.

The present invention, constructed as described above, is operated as follows.

As shown in FIG. 2, when the driver of a vehicle turns off an ignition key and then gets out of the vehicle while wipers are turned on, the emergency light I of the output unit 'O' blinks, so that the driver can be made aware of the operation state of the wipers. If the driver wants to stop the operation of the wipers, the driver can remotely transmit a wireless signal from outside the vehicle using the remote key 'k' of the input unit 'I', and an input signal is received by the reception unit 'r' of the electronic control unit 'ECU'.

The rain sensor unit 'S' senses the amount of rain, and transmits the input signal to the electronic control unit 'ECU'.

The electronic control unit 'ECU', which has received the remote wireless signal, commands the output unit 'O' to perform output. Since the drive power is firm power 'p', the wiper motor can be always operated even when an ignition key is turned off, and thus wipers in abnormal positions can return to their original states.

According to the present invention, the wiper system for a vehicle can be remotely controlled, so that the driver of a vehicle can control the operation of wipers from outside the vehicle, thereby improving the convenience of a vehicle. Further, an emergency light blinks when the drive power of the wiper motor is set to firm power 'p' and the driver of a vehicle turns off an ignition key and gets out of the vehicle while wipers are turned on, so that the driver can be easily made aware of the operation of the wipers and conveniently control the wipers.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An intelligent wiper control system for a vehicle, comprising:

an input unit configured to allow a driver of a vehicle to manipulate a wired/wireless switch and to turn the vehicle on or off;

a rain sensor unit configured to control speed of wipers based on an amount of rain; and an electronic control unit configured to control a wiper motor;

wherein the input unit comprises a remote key for inputting a signal for controlling driving of a wiper system and wirelessly transmitting the signal;

wherein the rain sensor unit senses an amount of rain;

wherein the electronic control unit comprises a reception unit for receiving the input wireless signal of the remote key of the input unit and the electronic control unit is configured to process the signal for controlling driving of the wiper system from the remote key and to generate control signals for the wiper system and an emergency light, so as to prevent the wiper from stopping in the middle of the windshield of a vehicle when an ignition key is turned off while the wipers are being operated, and to operate remotely the wiper system from outside the vehicle; and wherein the electronic control unit causes the emergency light to blink when drive power of the wiper motor is set to firm power and the driver of the vehicle turns off an ignition key and then gets out of the vehicle while wipers are turned on.

\* \* \* \* \*